United States Patent

[11] 3,602,488

[72] Inventor John R. Romig
Rialto, Calif.
[21] Appl. No. 18,517
[22] Filed Mar. 11, 1970
[45] Patented Aug. 31, 1971
[73] Assignee California Portland Company
Los Angeles, Calif.

[54] CEMENT RAW MIX CONTROL APPARATUS AND PROGRAMMING
20 Claims, 3 Drawing Figs.

[52] U.S. Cl............................................. 263/32, 263/53
[51] Int. Cl............................................. F27b 7/20
[50] Field of Search................................ 263/32, 53

[56] References Cited
UNITED STATES PATENTS

| | | | |
|---|---|---|---|
| 2,883,173 | 4/1959 | Laboulais..................... | 263/32 |
| 3,437,325 | 4/1969 | Putnam et al................. | 263/32 |
| 3,483,363 | 12/1969 | Ross........................... | 263/32 |

Primary Examiner—John J. Camby
Attorney—White & Haefliger

ABSTRACT: A system including computer apparatus and programming automatically controls the proportioning of raw materials fed to a kiln-producing cement clinker, the automatic control depending upon the analytical values of the various oxides of the raw materials, the result being a raw mix composition of optimum uniformity.

INVENTOR.
JOHN R. ROMIG
By White, Haefliger & Bachand
ATTORNEYS.

PATENTED AUG 31 1971

INVENTOR.
JOHN R. ROMIG
By
White, Haefliger & Backard
ATTORNEYS.

CEMENT RAW MIX CONTROL APPARATUS AND PROGRAMMING

BACKGROUND OF THE INVENTION

This invention relates generally to the proportioning of raw materials fed to a kiln, and more specifically concerns the control of such proportioning, depending upon the analytical values of the oxides of the raw materials, to result in a raw mix composition of optimum uniformity required for the kiln production of Portland Cement clinker.

The raw mix composition fed to a kiln as referred to will typically contain mixed lime rock, high lime rock, high magnesia rock, low alkali shale, higher alkali shale, silica rock and iron ore. The mixed lime rock typically controls the CaO content in the mix; however, if it contains too much MgO, more high lime rock is added to bring the MgO content down to desired level, or, if the mixed lime rock contains too little MgO, more high magnesia rock is added to raise the MgO content of the mix to desired level. The low alkali shale and higher alkali shale not only control $Al_2O_3$ content of the mix, but also control relative alkali content as between $Na_2O$ and $K_2O$.

In practice, it is found that the oxide contents of the raw materials described will vary from batch to batch loaded into the supply bins from which the feed is derived; accordingly, unless the proportioning of the feeds from the different bins is adjusted to compensate for such variations which can be quite small, a clinker of nonuniform composition will result, with its associated well-known disadvantages.

SUMMARY OF THE INVENTION

It is a major object of the invention to provide apparatus and associated computer programming for overcoming the above problems and disadvantages, and to result in automatically controlled proportioning of the feeds of the varying composition ingredients of the raw mix to result in a mix of uniform composition.

Basically, the invention is embodied in blend control apparatus for a cement clinkering Kiln feed, comprising a. first means to supply raw materials including lime rock, magnesia rock, alkali shale, silica rock and iron ore to the feed, b. second means to determine the relative amounts $S_x$, $A_x$, $F_x$ and $C_x$, of $SiO_2$, $Al_2O_3$, $Fe_2O_3$, and $CaO$, respectively, which are actually in the feed, c) third means to determine the relative amounts $S_c$, $A_c$, $F_c$ and $C_c$, of $SiO_2$, $Al_2O_3$, $Fe_2O_3$, and $CaO$, respectively, desired in the feed, d. fourth means to derive difference values $(\Delta S)_d$, $(\Delta A)_d$, $(\Delta F)_d$ and $(\Delta C)_d$ corresponding to $S_c - S_x$, $A_c - A_x$, $F_c - F_x$ and $C_c - C_x$, respectively, and also to derive $(\Delta HL)_o$ and $(\Delta HM)_o$ values, respectively, representing running changes in the lime and magnesium content of the feed, and e. fifth means responsive to said difference values for controlling said supply of lime rock, alkali shale, silica rock and iron ore to the feed.

As will be seen, the referred to third means may include computer circuitry responsive to preselected relative amounts of oxides of calcium, silicon, aluminum and magnesium (as for example $3CaO \cdot SiO_2$ and $3CaO \cdot Al_2O_3$ on an ignited basis, and $Al_2O_3$ and MgO on an unignited basis) to derive the relative amounts of $SiO_2$, $Al_2O_3$, $Fe_2O_3$ and CaO desired in the feed. Also, the referred to second means may include instrumentation to direct X-rays at feed samples, and to scan the latter for detecting secondary radiation emitted therefrom, as for example is described in U.S. Pat. No. 3,075,079 to Tabikh.

The referred to fifth means may typically include a computer operable to compute updated values $(R)_e$, $(Sh)_e$, $(Si)_e$ and $(O)_e$, respectively, for use in proportioning the supply of lime rock, alkali shale, silica rock and iron ore, where these values represent the sums of previously calculated values, plus $\Delta$ values, the latter being predetermined functions of $(\Delta C)_d$, $(\Delta S)_d$, $(\Delta A)_d$, $(\Delta F)_d$, $(\Delta HM)_o$ and $(\Delta HL)_o$, as will be described. Also, such fifth means typically includes means to test for the existence of a negative value for any of $(R)_e$, $(Sh)_e$, $(Si)_e$ and $(O)_e$, and in the event of such a negative value to test for the existence of a negative updated value of $(Sh)_e$. In the absence of the latter, the values of $(R)_e$, $(Sh)_e$, $(Si)_e$ and $(O)_e$ are recomputed in accordance with predetermined Matrix B functions of $(\Delta C)_d$, $(\Delta S)_d$, $(\Delta A)_d$, $(\Delta F)_d$, $(\Delta HM)_o$ and $(\Delta HL)_o$. Additional matrix routines are provided for further testing in the event of detected negative values for any of recomputed $(R)_e$, $(Sh)_e$, $(Si)_e$ and $(O)_e$, as will be described. The purpose of such routines is to take into account the possibility that one of the required oxides is already present in a sufficient amount in the raw materials. Provision for printout or other communication to the operator of the calculated or recalculated values enables him to exercise supervisory control, based on such knowledge of the contents of the raw mix.

These and other objects and advantages of the invention, as well as the details of an illustrative embodiment, will be more fully understood from the following specification and drawings, in which:

DRAWING DESCRIPTION

DETAILED DESCRIPTION

In a cement rotary kiln a homogeneous mix of cement making raw materials, called raw mix, is introduced at one end, and heat, coming from a flame by burning coal, oil or gas, is applied at the other end. Due to the rotation of the kiln, the raw mix migrates downwards towards the source of the heat (the flame), and during this downward motion it absorbs the heat. The raw mix will first give up its moisture content, and then it will take on endothermic heat and by doing so it will give up $CO_2$, and in its last phase of processing it will turn exothermic, giving up heat. In this last phase of the process the many complex cement compounds are formed leading to the formation of Portland cement clinker.

The clinker, leaving the rotary kiln, is discharged into a cooling device, today normally a traveling grate cooler, for the recuperation of heat to be returned to the rotary kiln, and for final cooling so the clinker can be handled for storage purposes.

The burning process and the different zones of heat transfer in a rotary cement kiln are described in U.S. Pat. No. 3,091,442 (J. R. Romig, et al.). The recuperation of heat from the cooling device (traveling grate cooler), and its effect on the burning process are described in U.S. Pat. No. 3,091,443 (J. H. Herz, et al.).

A typical, not optimum, raw kiln feed (raw mix) composition, clinker composition, is given below:

RAW MIX COMPOSITION

|  | Lbs. per Bbl. | Percent |
| --- | --- | --- |
| $SiO_2$ | 88.74 | 15.20 |
| $Al_2O_3$ | 17.30 | 2.96 |
| $Fe_2O_3$ Composition | 10.53 | 1.80 |
| $CaCO_3$ | 436.13 | 74.72 |
| $MgCO_3$ | 25.16 | 4.31 |
| $Na_2O$ | 1.13 | 0.19 |
| $K_2O$ | 1.88 | 0.32 |
| $FreeH_2O$ | 2.92 | 0.50 |
|  | Total: 583.79 | Total: 100.00 |

Figure 1:
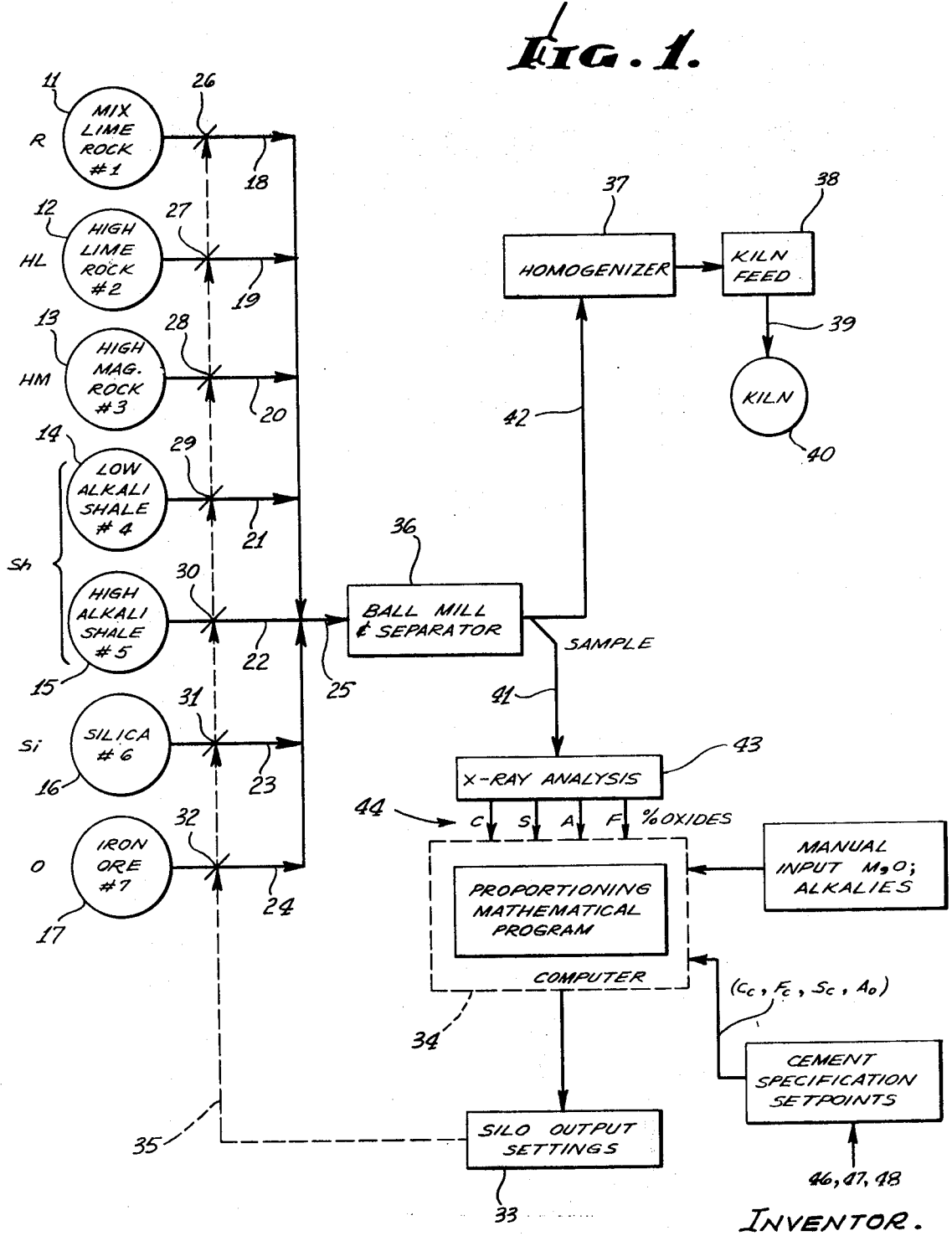
FIG. 1 is a flow chart of a raw mix proportioning system incorporating a digital computer.

Referring to FIG. 1, feed silos or bins for the seven major raw materials used in the raw mix are indicated at 11–17.

From these bins the materials are individually delivered at 18–24 and combined at 25, individual volumetric or weight controls being operable at 26–32 for controlling the proportions, by weight, of the materials flowing to the mixing point 25. The controls are adjusted at predetermined intervals, say between one-half hour and 2 hours (and preferably each hour) in response to control settings provided by the means 33, in turn controlled by proportioning calculations performed at intervals by the digital computer 34 . Means 33 may, for example, comprise digital to analog converter and amplifier apparatus having seven output channels indicated at 35 controlling the seven devices 26–32.

The material at 25 is passed in succession through the ball mill 36, homogenizer 37 and the kiln feed at 38, from which the material is passed at 39 to the cement clinker producing kiln 40. Provision is made at 41 for passing a continuous sample of the finish ground material 42 to online X-ray analyzer 43, as for example General Electric XEG equipment. The analyzer output at 44 consists of a percentage analysis of the sample oxides designated as follows (and which varies depending upon composition variations in different batches of raw materials):

| X-ray output (%) | Symbol |
|---|---|
| CaO | $C_x$ |
| $SiO_2$ | $S_x$ |
| $Al_2O_3$ | $A_x$ |
| $Fe_2O_3$ | $F_x$ |

Accordingly, means is provided to determine the relative amounts of the above oxides in the mix, and to periodically enter such values in the computer (say, once every 1–10 minutes, to be averaged for use in the proportioning calculation).

Figure 3:
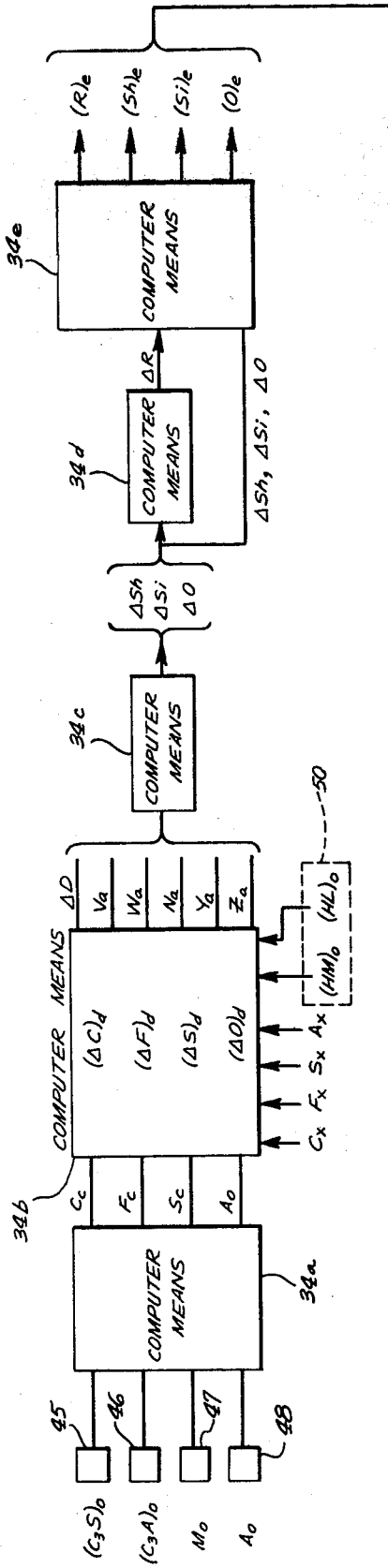
FIG. 3 is a block diagram of specific apparatus constructed to perform functions appearing in the FIG. 2 program outline.
Figure 3:
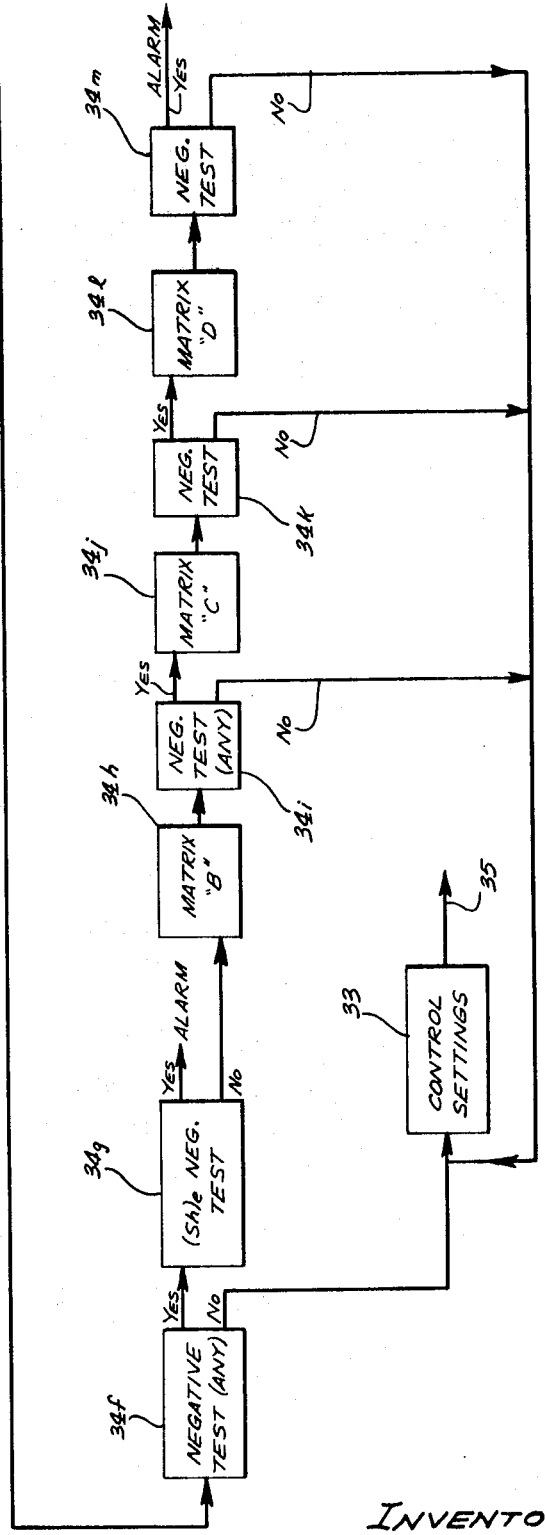

Means is also provided to determine the relative amounts $C_c$, $S_c$, $A_o$ and $F_c$ of CaO, $SiO_2$, $Al_2O_3$ and $Fe_2O_3$, respectively, which are desired in the feed to the kiln. Such means may for example include, as shown in FIG. 3, set point devices 45–48 (as for example manually controlled analog inputs —voltages, etc.) for selecting values of the following items familiar to the cement chemist:

| Item | Symbol |
|---|---|
| $3CaO \cdot SiO_2$ (ignited) | $C_3S$ |
| $3CaO \cdot Al_2O_3$ (ignited) | $C_3A$ |
| $Al_2O_3$ (raw basis) | $A_o$ |
| MgO (raw basis) | $M_o$ |

These inputs are fed to the computer 34a (which may be a part of computer 34), along with manually selected set point values for $(HM)_o$ and $(HL)_o$, and the computer responds to derive the desired values $C_c$, $S_c$, $A_o$ and $F_c$. For example, $C_c$, $F_c$ and $S_c$ may be calculated as follows, in a typical program (indicated by step number 3 in FIG. 2)

$$C_c = \frac{760.24 + (C_3S)_0 + 3.6480(C_3A)_0 - 13.2134 A_0}{17.5272 + 0.0077(C_3S)_0 + 0.0281(C_3A)_0}$$

$$\sim \frac{-M_0[0.0077(C_3S)_0 + 0.0281(C_3A)_0 + 13.4562]}{17.5272 + 0.0077(C_3S)_0 + 0.0281(C_3A)_0}$$

$$F_c = 1.5664 A_0 - [0.5910 - 0.0046(C_c + M_0)] \cdot [(C_3A)_0]$$

$$S_c = 100 - 2.9164 A_0 - 1.7700(C_c + M_0)$$
$$+ [0.5910 - 0.0046(C_c + M_0)] \cdot [(C_3A)_0]$$

Proportioning calculations, to determine values of $(R)_e$, $(Sh)_e$, $(Sc)_e$ and $(O)_e$ for use in establishing the control settings at 33 are performed by the computer 34 at predetermined intervals, as described. Such calculations are based on the delta differences between the desired oxides and actual oxides, defined as follows:

$$(\Delta C)_d C_c - C_x$$

$$(\Delta S)_d S_c - S_x$$

$$(\Delta A)_d A_o - A_x$$

$$(\Delta F)_d F_c - F_x$$

Figure 2:
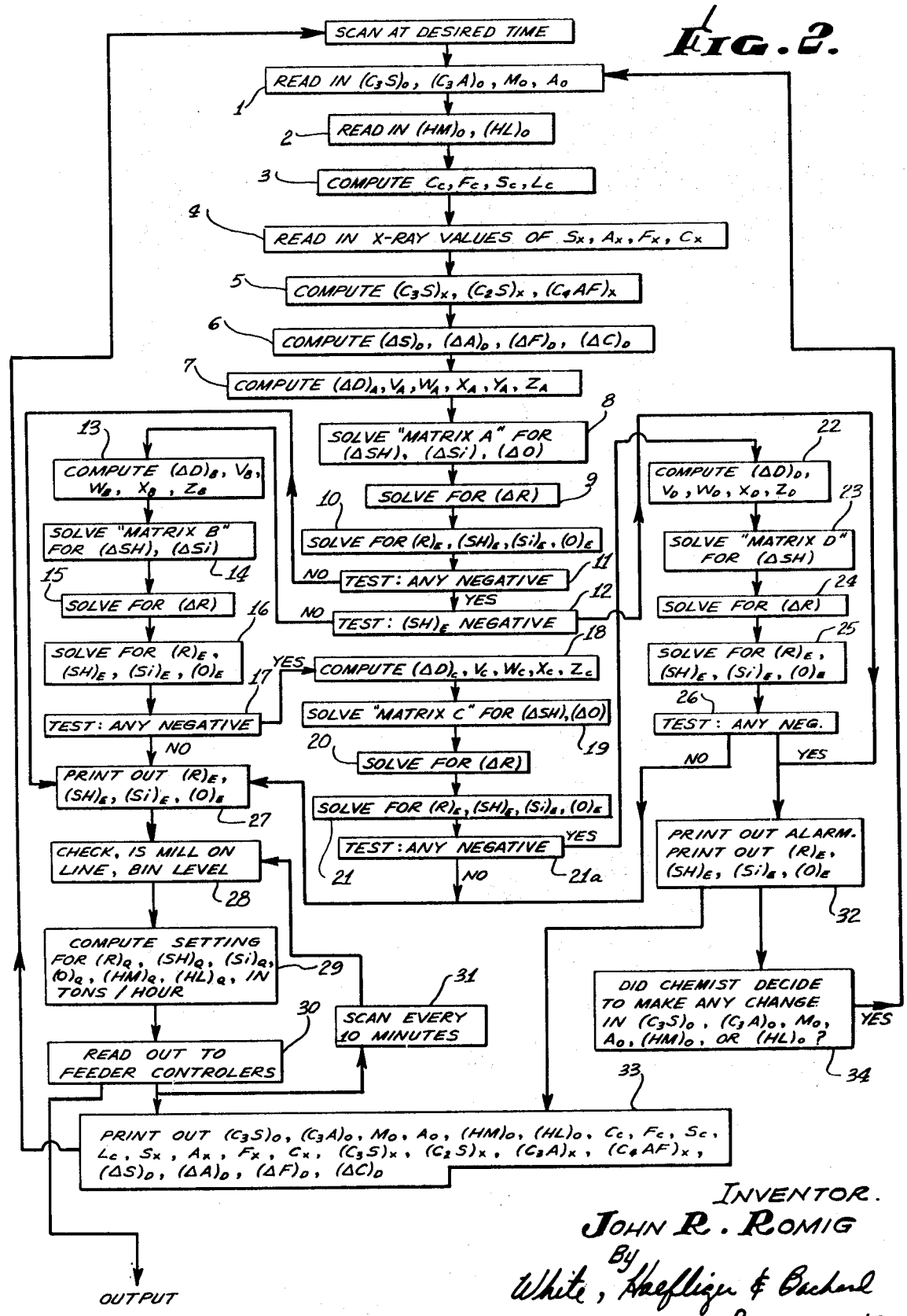
FIG. 2 is a program outline for computer control of the raw mix blend.

These values are shown in FIG. 3 as computed by means 34b (which may be part of computer 34), and this is also indicated by step 6 in FIG. 2. Values for $(C_3S)_x$, $(C_2S)_x$, $(C_3A)_x$ and $C_4AF)_x$ may also be calculated by the computer for print out (to be used by the technician as indicators) indicated by step 33 in FIG. 2, the equations for same being as follows:

$$L_x = 0.7700(C_x + M_0) = \text{loss of } CO_2$$

$$(C_3S)_x = \frac{4.0710 C_x - 7.6024 S_x - 1.4297 F_x - 6.7187 A_x}{1 - 0.01 L_x}$$

$$(C_2S)_x = \frac{2.8675 S_x}{1 - 0.01 L_x} - 0.7544(C_3S)_x$$

$$(C_3A)_x = \frac{2.6504 A_x - 1.6920 F_x}{1 - 0.01 L_x}$$

$$(C_4AF)_x = \frac{3.0432 F_x}{1 - 0.01 L_x}$$

Before describing the further calculations to determine the values $(R)_e$, $(Sh)_e$, $(Si)_e$ and $(O)_e$, the functions of the raw materials to control the oxides should be observed, as summarized in the following tabulations:

| Symbol | Raw Material | Material |
|---|---|---|
| R | Raw material No. 1: | Mixed lime rock |
| HL | Raw material No. 2: | High lime rock |
| HM | Raw material No. 3: | High magnesia rock |
| Sh { | Raw material No. 4: | Low alkali shale |
|  | Raw material No. 5: | Higher alkali shale |
| Si | Raw material No. 6: | Silica rock |
| O | Raw material No. 7: | Iron ore |

| Raw Material | Oxide controlled |
|---|---|
| No. 1 | CaO |
| No. 2 or No. 3 | MgO |
| No. 4 and No. 5 | $Al_2O_3$ and alkalis |
| No. 6 | $SiO_2$ |
| No. 7 | $Fe_2O_3$ |

Raw material No. 2 or No. 3 provides the means for final control of MgO content, and therefore both materials are, typically, not used at the same time. Thus, if raw material No. 1 contains too much MgO, raw material No. 2 is added to bring the MgO content down to the desired MgO level; or, if the MgO content in raw material No. 1 is too low, raw material No. 3 is added to raise the MgO level to the desired hold point. Due to the relatively low atomic number of MgO, resulting in a long count-time duration in the X-ray analyzer 43, the data $(HL_o$ and $HM_o)$ for MgO is entered into the computer program less frequently, i.e., not automatically from the X-ray apparatus online or offline, but by manual input over a manual input console designated at 50 in FIG. 3, for example.

Raw materials No. 4 and 5 provide the final alkali control, as well as the $Al_2O_3$ control. Both shales contain similar amounts of the oxide $Al_2O_3$, but contain very different amounts of the alkalis $N_2O$ and $K_2O$. To assure that a desired holding point of alkalis is met, these two raw materials are used at the same time, and designated as "Sh," but in a predetermined ratio to each other (as established by the volumetric or weight controls at 29 and 30).

It should also be pointed out that set point inputs $(C_3S)_o$, $(C_3A)_o$, $M_o$ and $A_o$ to the computer will vary in accordance with the chosen cement composition to be produced. Percentage composition, by weight, of these quantities will vary within the following ranges:

| Symbol | Amount (by weight) |
|---|---|
| $(C_3S)_o$ | 45%–75% |
| $(C_3A)_o$ | 5%–15% |
| $M_o$ | 1%–3% |
| $A_o$ | 2%–6% |

Proceeding, now, with the description of the derivation of updated values $(R)_e$, $(Sh)_e$, $(Si)_e$ and $(O)_e$, means is provided to be responsive to the difference values $(\Delta C)_d$, $(\Delta S)_d$, $(\Delta A)_d$ and $(\Delta F)_d$ to produce the updated values referred to. Such means may, for example, include the computers $34c$, $34d$ and $34e$ seen in FIG. 3, and which may also comprise parts of computer 34 in FIG. 1. In this regard, the updated values are defined as follows:

$$(Sh)_e = (Sh)_s + (\Delta Sh)$$

$$(Si)_e = (Si)_s + (\Delta Si)$$

$$(O)_e = (O)_s + (\Delta O)$$

$$(R)_e = (R)_s + (\Delta R)$$

where $(R)_s$, $(Sh)_s$, $(Si)_s$ and $(O)_s$ represent the previously calculated values of $(R)_e$, $(Sh)_e$, $(Si)_e$ and $(O)_e$, and wherein, functionally, $\Delta Sh = \Delta Sh[(\Delta C)_d, (\Delta S)_d, (\Delta A)_d, (\Delta F)_d, (\Delta HM)_o, (\Delta HL)_o]$
$\Delta Si = \Delta Si[(\Delta C)_d, (\Delta S)_d, (\Delta A)_d, (\Delta F)_d, (\Delta HM)_o, (\Delta HL)_o]$
$\Delta O = \Delta O[(\Delta C)_d, (\Delta S)_d, (\Delta A)_d, (\Delta F)_3, (\Delta HM)_o, (\Delta HL)_o]$
$\Delta R = \Delta R[(\Delta Sh), (\Delta Si), (\Delta O), (\Delta HM)_o, (\Delta HL)_o]$ In a specific case, the above quantities are defined as follows:
$(\Delta Sh) = A10.010368V_a - 0.003007W_a + 0.112038X_a + 0.007216YC_a + 0.006489Z_a$
$(\Delta Si) = A10.000306V_a + 0.012824W_a - 0.64980X_a + 0.00137$
$\cdot 0.000014Z_a$
$(\Delta O) = -0.000911V_a + W_a - 0.007471X_a + 0.017291Y_a - 0.001108ZCz$
$(\Delta R) = [(\Delta Sh) + (\Delta Si) + (\Delta O) + (\Delta HM)_o + (\Delta HL)_o]$ where:
$(\Delta D)_a = -[(\Delta C)_d + \Delta_{Sjd} + (\Delta A)_d + (\Delta F)_d]$
$V_a = (\Delta C)_d - 44.20(\Delta HM)_o - 53.35(\Delta HL)_o$
$W_a = (\Delta S)_d - 8.00(\Delta HM)_o - 2.00(\Delta HL)_o$
$X_a = (\Delta A)_d - 1.80(\Delta HM)_o - 0.44(\Delta HL)_o$
$Y_a = (\Delta F)_d - 1.30(\Delta HM)_o - 0.20(\Delta HL)_o$
$Z_a = (\Delta D)_a - 44.70(\Delta HM)_o - 44.01(\Delta HL)_o$
$(\Delta HM)_o = (\Delta HM)_o$ currently entered $-(HM)_o$ last used
$(\Delta HL)_o = (\Delta HL)_o$ currently entered $-(HL)_o$ last used In FIG. 2, the step 8 is performed by the computer means $34c$ of FIG. 3, and the step 9 is performed by the computer means $34d$ of FIG. 3. Step 10 of FIG. 2 corresponds to the operation of computer means $34e$ of FIG. 3.

The values $(R)_e$, $(Sh)_e$, $(Si)_e$ and $(O)_e$ are next tested by computer means $34f$ (step 11 of FIG. 2) for the existence of any negative, in the absence of which the values are printed out at 53 and settings $(R)_q$, $(HL)_q$, $(HM)_q$, $(Sh)_q$, $(Si)_q$, and $(O)_q$ for the controls 26–32 are derived at 33 in FIGS. 1 and 3. In the event of a negative value detected at $34f$ in FIG. 3, the computer $34g$ next tests for a negative value of $(Sh)_e$, and in the presence of same an alarm 54 is effected, as further indicated by step 32 in FIG. 2 with accompanying print out of all indicated values. In the absence of a negative value for $(Sh)_e$, values for $(R)_e$, $(Sh)_e$ and $(Si)_e$ are recomputed by the Matrix or Routine B computer means $34h$, after first recomputing values for $(\Delta Sh)$, $(\Delta Si)$ and $(\Delta R)$, all in accordance with the following equations:

$(Sh)_e = (Sh)_s + (\Delta Sh)$
$(Si)_e = (Si)_s + (\Delta Si)$
$(O)_e =$ zero
$(R)_e = (R)_s + (\Delta R)$ where:
$(\Delta Sh) = A10.009689V_b 0.002985W_b 0.106473X_b + 0.005663Z_b$
$(\Delta Si) = A0.000249V_b + W_b - 0.064512X_b + Z_b$
$(\Delta R) = -[(\Delta Sh) + (\Delta Si) - (O)_s + (\Delta HM)_o + (\Delta HL)_o]$
$(\Delta D)_b = -[(\Delta C)_d + (\Delta S)_d + (\Delta A)_d]$
$V_b = V_a + 7.80(O)_s$
$W_b = W_a + 16.80(O)_s$
$X_b = X_a + 4.40(O)_s$
$Z_b = (\Delta D)_b - 46.00(\Delta HM)_o - 44.21(\Delta HL)_o + 71.00(O)_s$ In the above, the $Fe_2O_3$ is in sufficient quantities in the mix lime rock present, so that $(O)_e$ is set to zero, and no control over iron ore is exercised.

Thereafter, computer means $34i$ tests for a negative value for any of recomputed $(R)_e$, $(Sh)_e$, $(Si)_e$ and $(O)_e$ and in the absence of same, the same steps 27–30 in FIG. 2 are performed, and the control settings are enabled at 33. However, if a negative value for any of recomputed $(R)_e$, $(Sh)_e$ or $(R)_e$ is detected, the Matrix C computer $34j$ is enabled to again recompute values for these terms, $(Si)_e$ being set to zero, all in accordance with the following equations:

$(Sh)_e = (Sh)_s + (\Delta Sh)$
$(Si)_e = (Si)_s - (Si)_s =$ Zero
$(O)_e = (O)_s + (\Delta_{O})$
$(R)_e = (R)_s + (\Delta R)$ where:
$(\Delta Sh) = 10.009871V_c + 0.017829W_c = 10.005368Y_c + 0.006465Z_c$
$(\Delta O) = 0.000881V_c - W_c + Y_c - 0.001107Z_c$
$(\Delta R) = -[(\Delta Sh) - (\Delta Si)_s + (\Delta O) + (\Delta_a + 2.70(Si)_s$
$W_c = W_a + 91.00(Si)_s$
$Y_c = Y_a + 1.00(Si)_s$
$Z_c = (\Delta D)_c - 46.50(\Delta HM)_o c144.45(\Delta HL)_o + 5.30(Si)_s$ In the above, $(Si)_e$ is set to zero and no control is exercised over silica in the mix.

Thereafter, computer means $34k$ tests for a negative value for any of again recomputed $(R)_e$, $(Sh)_e$, $(Si)_e$ and $(O)_e$ and in the absence of same, the steps 27–30 in FIG. 2 are performed and the control settings are enabled at 33. However, if a negative value for any of the again recomputed values is detected, the matrix D computer $34l$ is enabled to once again recompute values for these terms, $(Si)_e$ and $(O)_e$ both being set to zero, all in accordance with the following equations:

$(Sh)_e = (Sh)_s + (\Delta Sh)$
$(Si)_e = (Si)_s - (Si)_s =$ zero
$(O)_e = (O)_s - (O)_s =$ zero
$(R)_e = (R)_s + (\Delta R)$ where:
$(\Delta Sh) = A10.009300V_d 0.017035W_d 0.005749Z_d$
$(\Delta R) = -[(\Delta Sh) - (\Delta Si)_s - (O) + (\Delta HM)_o + (\Delta HL)_o]$
$(\Delta D)_d = [(\Delta C)_d + (\Delta S)_d]$
$V_d = V_a + 2.70(Si)_s + 7.80(O)_s$
$W_d = W_a + 91.00(Si)_s + 1680(O)_s$
$Z_d = (\Delta D)_d - 47.80(\Delta HM)_o c144.65(\Delta HL)_o + 6.30(Si)_s + 75.40(O)_s$ In the above the silica and iron ore in the mix are not controlled, as sufficient quantities are present in the mix lime rock, so that both values $(O)_e$ and $(Si)_e$ are set to zero.

Computer means $34m$ in FIG. 3 tests for a negative value for any of matrix D computed $(R)_e$, $(Sh)_e$, $(Si)_e$ and $(O)_e$, and in the absence of same the steps 27–30 in FIG. 2 are performed. If a negative value is detected, an alarm is printed out at 58 (see step 32 in FIG. 2).

In the above matrix B, C and D routines, the recomputed values for $(R)_e$, $(Sh)_e$, $(Si)_e$ and $(O)_e$ are utilized to determine the control settings at 33, as also indicated in FIG. 3.

In FIG. 2, the values indicated in the step blocks 1, 3 and 6 are typically computed and/or read in at regular intervals as for example at intervals between one-half hour and 2 hours, and preferably about hourly. Also, the values in the step block number 4 represent average values determined during the next preceding interval as defined, as for example during the next preceding hour. The values appearing in block 33, for printout, represent those values appearing in blocks 1–6.

Referring again to the difference values $(\Delta S)_d$, $(\Delta A)_d$, $(\Delta F)_d$ and $(\Delta C)_d$, it will be appreciated that the values for $(R)_e$, $(Sh)_e$, $(Si)_e$ and $(O)_e$ computed by the computer means are such as to lead to the adjustment of flow control gates as at 26 and 27–32 so as to reduce said difference values. Also, in FIGS. 1 and 2, the computed values $(R)_q$, $(Sh)_q$, $(Si)_q$ and $(O)_q$ may be analog values (for controlling gates 26 and 29–31) representing tons per hour flow, proportional to $(R)_e$, $(Sh)_e$, $(Si)_e$ and $(O)_e$; and, the computed values $(HL)_q$ and $(HM)_q$ may be analog values (for controlling gates as at 27 and 28) representing tons per hour flow, and proportional to the manual settings $(HM)_o$ and $(HL)_o$.

I claim:

1. Raw mix blend control apparatus for a cement clinkering kiln feed, comprising
   a. first means to supply raw materials including lime rock, magnesia rock, alkali shale, silica rock and iron ore to the feed,
   b. second means to determine the relative amounts $S_x$, $A_x$, $F_x$ and $C_x$ of $SiO_2$, $Al_2O_3$, $Fe_2O_3$ and $CaO$, respectively, desired in the feed,
   d. fourth means to derive difference values $(\Delta S)_d$, $(\Delta A)_d$, $(\Delta F)_d$ and $(\Delta C)_d$ corresponding to $S_c - S_x$, $A_c - A_x$, $F_c - F_x$ and $C_c - C_x$, respectively, and also to derive $(\Delta HL)_o$ and $(\Delta HM)_o$ values respectively representing running changes in the lime and magnesium content of the feed, and
   e. fifth means responsive to said difference values for controlling said supply of lime rock, alkali shale, silica rock and iron ore to the feed.

2. The apparatus of claim 1 wherein said third means includes a computer responsive to selected relative amounts of oxides of calcium, silicon, aluminum, and magnesium to derive said $S_c$, $A_c$, $F_c$ and $C_c$ values.

3. The apparatus of claim 1 wherein said third means includes a computer responsive to selected values $(C_3S)_o$, $(C_3A)_o$, $M_o$ and $A_o$ to derive said $S_c$, $A_c$, $F_c$ and $C_c$ values, where:

$(C_3S)_o$a $q \times 3\, CaO \cdot SiO_2$ (ignited basis
$(C_3A)_o$a $8 \times 3\, CaO \cdot Al_2O_3$ (ignited basis)
$A_o = Al_2O_3$ (unignited basis)
$M_o = MgO$ (unignited basis)

4. Apparatus as defined in claim 1 wherein said fifth means include flow controllers to control the flow of said raw materials.

5. Apparatus as defined in claim 4 wherein said first means includes separate bins for said respective materials, the flow controllers individually controlling the flow of materials from the separate bins.

6. Apparatus as defined in claim 1 wherein said second means includes instrumentation to direct X-rays at samples of the feed, and to scan the samples for detecting secondary radiation emitted therefrom.

7. Apparatus as defined in claim 1 wherein said second means also includes a mill for grinding said feed, the samples being obtained from the mill output.

8. Apparatus as defined in claim 1 wherein said fifth means includes computer means to compute updated values $(R)_e$, $(Sh)_e$, $(Si)_e$ and $(O)_e$, respectively, for use in proportioning the supply of lime rock, alkali shale, silica rock and iron ore, said updated values being defined as follows:

$(R)_e = (R)_s + (\Delta R)$
$(Sh)_e = (Sh)_s + (\Delta Sh)$
$(Si)_e = (Si)_s + (\Delta Si)$
$(O)_e = (O)_s + (\Delta O)$ where $(R)_s$, $(Sh)_s$, $(Si)_s$ and $(O)_s$ represent the next previously calculated values of $(R)_e$, $(Sh)_e$, $(Si)_e$ and $(O)_e$, and wherein
$(\Delta Sh) = (\Delta Sh)[(\Delta C)_d, (\Delta S)_d, (\Delta A)_d, (\Delta F)_d, (\Delta HM)_o, (\Delta HL)_o]$b
$(\Delta Si) = (\Delta Si)[(\Delta C)_d, (\Delta S)_d, (\Delta A)_d, (\Delta F)_d, (\Delta HM)_o, (\Delta HL)_o]$
$(\Delta O) = (\Delta O)[(\Delta C)_d, (\Delta S)_d, (\Delta A)_d, (\Delta F)_d, (\Delta HM)_o, (\Delta HL)_o]$b
$(\Delta R) = (\Delta R)[(\Delta Sh), (\Delta Si), (\Delta O), (\Delta HM)_o, (\Delta HL)_o]$
$(\Delta HM)_o$ currently entered $(HM)_o$ − last used $(HM)_o$
$(\Delta HL)_o$ currently entered $(HL)_o$ − last used $(HL)_o$ 9. Apparatus as defined in claim 8 wherein:
$\Delta Sh \cong 0.010368 V_a - W_a + X_a - 0.007216 Y_a + \xi \lambda^{0.006489} Z_a$ where:
$V_a = (\Delta C)_d - 44.20(\Delta HM)_o c 153.35(\Delta HL)_o$
$W_a = (\Delta S)_d - 8.00(\Delta HM)_o 2.00(\Delta HL)_o$
$X_a = (\Delta A)_d - 1.20(\Delta HM)_o 0.44(\Delta HL)_o$
$Y_a = (\Delta F)_d - 1.30(\Delta HM)_o 0.20(\Delta HL)_o$
$Z_a = (\Delta D)_a - 44.70(\Delta HM)_o c 144.01(\Delta HL)_o$
and,
$(\Delta D)_a = [(\Delta C)_d + (\Delta S)_d + (\Delta A)_d + (\Delta F)_d]$ 10. Apparatus as defined in claim 9 wherein
$(\Delta Si) = 40.000306 V_a + W_a - X_{a-1} + 0.00137 - 0.000014 Z_a$.

11. Apparatus as defined in claim 10 wherein:
$(\Delta O) = 0.000911 V_a + W_a - X_a + 0.017291 Y_a - \xi \lambda^{0.001108} Z_a$ 12. Apparatus as defined in claim 11 wherein:
$(\Delta R) = -[(\Delta Sh) + (\Delta Si) + (\Delta O) + (\Delta HM)_o + (\Delta HL)_o]$.

13. Apparatus as defined in claim 8 wherein said fifth means includes means to test for the existence of a negative updated value of any of $(R)_e$, $(Sh)_e$, $(Si)_e$ and $(O)_e$.

14. Apparatus as defined in claim 8 including means to test for the existence of a negative updated value of $(Sh)_e$, and in that event, to provide an alarm signal.

15. Apparatus as defined in claim 13 including means operable in the event of such a negative value to test for the existence of a negative value of $(Sh)_e$ and, in the absence thereof, to recompute values for $(R)_e$, $(Sh)_e$ and $(Si)_e$ ($(O)_e$ being set to zero) in accordance with the definitions thereof in claim 8 and wherein, specifically, $\Delta Sh = -0.009689 V_b 0.002985 W_b 0.106473 X_b + 0.005663 Z_b$
$\Delta Si = 0.000249 V_b + W_b - 0.064512 X_b + Z_b$
$\Delta R = -[(\Delta Sh) + (\Delta Si) - (\Delta O)_s + (\Delta HM)_o + (\Delta HL)_o]$
$(\Delta D)_b = -[(\Delta C)_d + (\Delta S)_d + (\Delta A)_d]$
$V_b = V_a + 7.80(O)_s$
$W_b = W_a + 16.80(O)_s$
$X_b = X_a + 4.40(O)_s$
$Z_b = (\Delta D)_b = 46.00 (\Delta HM)_o - 44.21 (\Delta HL)_o + 71.00 (O)_s$ 16. Apparatus as defined in claim 15 including means to test for the existence of a negative value for any of recomputed $(R)_e$, $(Sh)_e$, $(Si)_e$ and $(O)_e$, and in the absence thereof, to enable said control of the supply of lime rock, alkali shale, silica rock and iron ore with relative proportioning corresponding to said recomputed values.

17. Apparatus as defined in claim 16 including means operable in response to the existence of a negative value for any of recomputed $(R)_e$, $(Sh)_e$, $(Si)_e$ and $(O)_e$ to again recompute values therefore in accordance with the definitions thereof in claim 8 and wherein, specifically, $(\Delta Sh) = 10.009871 V_c + 0.017829 W_c = 10.005368 Y_c + 0.006465 Z_c$
$(\Delta O) = 0.000881 V_c - W_c - Y_c - 0.001107 Z_c$
$(\Delta R) = -[(\Delta Sh) - (Si)_s + (\Delta O) + (\Delta HM)_o + (\Delta HL)_o]$
$(\Delta D)_c - [(\Delta C)_d + (\Delta S)_d + (\Delta F)_o]$
$V_c = V_a + 2.70(Si)_s$
$W_c = W_a bz 91.00(Si)_s$
$Y_c = Y_a az 1.00(Si)_s$
$z_c = (\Delta D)_c - 46.50(\Delta HM)_o c 144.45(\Delta HL)_o + 5.30(Si)_s$ 18. Apparatus as defined in claim 17 including means to test for the existence of a negative value for any of again recomputed $(R)_e$, $(Sh)_e$, $(Si)_e$ and $(O)_e$, and in the absence thereof, to enable said control of the supply of lime rock, alkali shale, silica rock and iron ore with relative proportioning corresponding to said again recomputed values.

19. Apparatus as defined in claim 18 including means operable in response to the existence of a negative value for any of the again recomputed $(R)_e$, $(Sh)_e$, $(Si)_e$ and $(O)_e$ to once again recompute values therefor in accordance with the definitions thereof in claim 8 and wherein, specifically, $(\Delta Sh) = A/0.009300 V_d 0.017035 W_d 0.005749 Z_d$ $(\Delta R) = -](\Delta Sh) - (Si)_s - (O) + (\Delta HM)_o + (\Delta HL)_o]$
$(\Delta D)_d - [(\Delta C)_d + (\Delta S)_d]$
$V_d = V_d + 2.70(Si)_s + 7.80(O)_s$
$W_d = W_d + 91.00(Si)_s + 1680(O)_s$
$Z_d = (\Delta D)_d - 47.80(\Delta HM)_o c / 44.65(\Delta HL)_o + 6.30(Si)_s + 75.40(O)_s$

20. Apparatus as defined in claim 8 including means to record the updated values of $(R)_e$, $(Sh)_e$, $(Si)_e$ and $(O)_e$.

UNITED STATES PATENT OFFICE
CERTIFICATE OF CORRECTION

Patent No. 3,602,488            Dated August 31, 1971

Inventor(s) John R. Romig

It is certified that error appears in the above-identified patent and that said Letters Patent are hereby corrected as shown below:

On the title page of the patent, the name of the assignee should read, --California Portland Cement Company--

Column 4, lines 4-9

$$`` (\Delta C)_d \quad C_c - C_x$$
$$(\Delta S)_d \quad S_c - S_x$$
$$(\Delta A)_d \quad A_o - A_x$$
$$(\Delta F)_d \quad F_c - F_x \text{ ''}$$

should read $$--(C)_d = C_c - C_x$$
$$(S)_d = S_c - S_x$$
$$(A)_d = A_o - A_x$$
$$(F)_d = F_c - F_x --$$

UNITED STATES PATENT OFFICE
CERTIFICATE OF CORRECTION

Patent No. 3,602,488     Dated August 31, 1971

Inventor(s)  John R. Romig

It is certified that error appears in the above-identified patent and that said Letters Patent are hereby corrected as shown below:

Column 5, lines 40-75 should read:

$$\Delta Sh = \Delta Sh\left[(\Delta C)_d, (\Delta S)_d, (\Delta A)_d, (\Delta F)_d, (\Delta HM)_o, (\Delta HL)_o\right]$$

$$\Delta Si = \Delta Si\left[(\Delta C)_d, (\Delta S)_d, (\Delta A)_d, (\Delta F)_d, (\Delta HM)_o, (\Delta HL)_o\right]$$

$$\Delta O = \Delta O\left[(\Delta C)_d, (\Delta S)_d, (\Delta A)_d, (\Delta F)_d, (\Delta HM)_o, (\Delta HL)_o\right]$$

$$\Delta R = \Delta R\left[(\Delta Sh), (\Delta Si), (\Delta O), (\Delta HM)_o, (\Delta HL)_o\right]$$

In a specific case, the above quantities are defined as follows:

$$(\Delta Sh) = 0.010368 V_a - 0.003007 W_a + 0.112038 X_a - 0.007216 Y_a + 0.006489 Z_a$$

$$(\Delta Si) = 0.000306 V_a + 0.012824 W_a - 0.64980 X_a + 0.00137 \cdot 0.000014 Z_a$$

$$(\Delta O) = 0.000911 V_a + 0.000029 W_a - 0.007471 X_a + 0.017291 Y_a - 0.001108 Z_a$$

$$(\Delta R) = \left[(\Delta Sh) + (\Delta Si) + (\Delta O) + (\Delta HM)_o + (\Delta HL)_o\right]$$

where:

$$(\Delta D)_a = -\left[(\Delta C)_d + (\Delta S)_d + (\Delta A)_d + (\Delta F)_d\right]$$

$$V_a = (\Delta C)_d - 44.20 (\Delta HM)_o - 53.35 (\Delta HL)_o$$

$$W_a = (\Delta S)_d - 8.00 (\Delta HM)_o - 2.00 (\Delta HL)_o$$

$$X_a = (\Delta A)_d - 1.80 (\Delta HM)_o - 0.44 (\Delta HL)_o$$

UNITED STATES PATENT OFFICE
CERTIFICATE OF CORRECTION

Patent No. __3,602,488__  Dated __August 31, 1971__

Inventor(s) __John R. Romig__

It is certified that error appears in the above-identified patent and that said Letters Patent are hereby corrected as shown below:

$$Y_a = (\Delta F)_d - 1.30(\Delta HM)_o - 0.20(\Delta HL)_o$$

$$Z_a = (\Delta D)_a - 44.70(\Delta HM)_o - 44.01(\Delta HL)_o$$

$$(\Delta HM)_o = (HM)_o \text{ currently entered} - (HM)_o \text{ last used}$$

$$(\Delta HL)_o = (HL)_o \text{ currently entered} - (HL)_o \text{ last used}$$

In Fig. 2, the step 8 is performed by the computer means 34c of Fig. 3, and the step 9 is performed by the computer means 34d of Fig. 3. Step 10 of Fig. 2 corresponds to the operation of computer means 34e of Fig. 3.

The values $(R)_e$, $(Sh)_e$, $(Si)_e$ and $(O)_e$ are next tested by computer means 34f (step 11 of Fig. 2) for the existence of any negative, in the absence of which the values are printed out at 53 and settings $(R)_q$, $(HL)_q$, $(HM)_q$, $(Sh)_q$, $(Si)_q$, and $(O)_q$ for the controls 26-32 are derived at 33 in Figs. 1 and 3. In the event of a negative value detected at 34f in Fig. 3, the computer 34g next tests for a negative value of $(Sh)_e$, and in the presence of same an alarm 54 is effected, as further indicated by step 32 in Fig. 2 with accompanying print out of all indicated values. In the absence of a negative value for $(Sh)_e$, — —

UNITED STATES PATENT OFFICE
CERTIFICATE OF CORRECTION

Patent No. 3,602,488      Dated August 31, 1971

Inventor(s) John R. Romig

It is certified that error appears in the above-identified patent and that said Letters Patent are hereby corrected as shown below:

Columns 6, 7, 8, 9 and 10 should read:

-- values for $(R)_e$, $(Sh)_e$ and $(Si)_e$ are re-computed by the Matrix or Routine B computer means 34<u>h</u>, after first re-computing values for $(\Delta Sh)$, $(\Delta Si)$ and $(\Delta R)$, all in accordance with the following equations:

$$(Sh)_e = (Sh)_s + (\Delta Sh)$$
$$(Si)_e = (Si)_s + (\Delta Si)$$
$$(O)_e = zero$$
$$(R)_e = (R)_s + (\Delta R)$$

UNITED STATES PATENT OFFICE
CERTIFICATE OF CORRECTION

Patent No. 3,602,488            Dated August 31, 1971

Inventor(s) John R. Romig

It is certified that error appears in the above-identified patent and that said Letters Patent are hereby corrected as shown below:

where:

$$(\Delta Sh) = -0.009689 V_b - 0.002985 W_b + 0.106473 X_b + 0.005663 Z_b$$

$$(\Delta Si) = 0.000249 V_b + 0.12823 W_b - 0.064512 X_b + 0.00055 Z_b$$

$$(\Delta R) = -\left[(\Delta Sh) + (\Delta Si) - (O)_s + (\Delta HM)_o + (\Delta HL)_o\right]$$

$$(\Delta D)_b = -\left[(\Delta C)_d + (\Delta S)_d + (\Delta A)_d\right]$$

$$V_b = V_a + 7.80 (O)_s$$

$$W_b = W_a + 16.80 (O)_s$$

$$X_b = X_a + 4.40 (O)_s$$

$$Z_b = (\Delta D)_b - 46.00 (\Delta HM)_o - 44.21 (\Delta HL)_o + 71.00 (O)_s$$

In the above, the $Fe_2O_3$ is in sufficient quantities in the mix lime rock present, so that $(O)_e$ is set to zero, and no control over iron ore is exercised.

Thereafter, computer means 34i tests for a negative value for any of recomputed $(R)_e$, $(Sh)_e$, $(Si)_e$ and $(O)_e$ and in the absence of same, the same steps 27-30 in Fig. 2 are performed, and the control settings are enabled at 33. However, if a negative value for any of re-

UNITED STATES PATENT OFFICE
CERTIFICATE OF CORRECTION

Patent No. __3,602,488__    Dated __August 31, 1971__

Inventor(s) __John R. Romig__

It is certified that error appears in the above-identified patent and that said Letters Patent are hereby corrected as shown below:

computed $(R)_e$, $(Sh)_e$ or $(R)_e$ is detected, the Matrix C computer $34\underline{j}$ is enabled to again recompute values for these terms, $(Si)_e$ being set to zero, all in accordance with the following equations:

$$(Sh)_e = (Sh)_s + (\Delta Sh)$$
$$(Si)_e = (Si)_s - (Si)_s = \text{Zero}$$
$$(O)_e = (O)_s + (\Delta O)$$
$$(R)_e = (R)_s + (\Delta R)$$

where:

$$(\Delta Sh) = -0.009871 V_c + 0.017829 W_c - 0.005368 Y_c + 0.006465 Z_c$$

$$(\Delta O) = 0.000881 V_c - 0.001227 W_c + 0.017180 Y_c - 0.001107 Z_c$$

$$(\Delta R) = -\left[(\Delta Sh) - (Si)_s + (\Delta O) + (\Delta HM)_o + (\Delta HL)_o\right]$$

$$(\Delta D)_c = -\left[(\Delta C)_d + (\Delta S)_d + (\Delta F)_o\right]$$

$$V_c = V_a + 2.70 (Si)_s$$

$$W_c = W_a + 91.00 (Si)_s$$

$$Y_c = Y_a + 1.00 (Si)_s$$

$$Z_c = (\Delta D)_c - 46.50 (\Delta HM)_o - 44.45 (\Delta HL)_o + 5.30 (Si)_s$$

UNITED STATES PATENT OFFICE
CERTIFICATE OF CORRECTION

Patent No. 3,602,488            Dated August 31, 1971

Inventor(s) John R. Romig

It is certified that error appears in the above-identified patent and that said Letters Patent are hereby corrected as shown below:

In the above, $(Si)_e$ is set to zero and no control is exercised over silica in the mix.

Thereafter, computer means 34$\underline{k}$ tests for a negative value for any of again re-computed $(R)_e$, $(Sh)_e$, $(Si)_e$ and $(O)_e$ and in the absence of same, the steps 27 - 30 in Fig. 2 are performed and the control settings are enabled at 33. However, if a negative value for any of the again re-computed values is detected, the Matrix D computer 34$\underline{1}$ is enabled to once again re-compute values for these terms, $(Si)_e$ and $(O)_e$ both being set to zero, all in accordance with the following equations:

$$(Sh)_e = (Sh)_s + (\Delta Sh)$$
$$(Si)_e = (Si)_s - (Si)_s = \text{zero}$$
$$(O)_e = (O)_s - (O)_s = \text{zero}$$
$$(R)_e = (R)_s + (\Delta R)$$

where:

$$(\Delta Sh) = -0.009300 V_d + 0.017035 W_d + 0.005749 Z_d$$
$$(\Delta R) = -\left[(\Delta Sh) - (Si)_s - (O) + (\Delta HM)_o + (\Delta HL)_o\right]$$
$$(\Delta D)_d = -\left[(\Delta C)_d + (\Delta S)_d\right]$$
$$V_d = V_a + 2.70(Si)_s + 7.80(O)_s$$

UNITED STATES PATENT OFFICE
CERTIFICATE OF CORRECTION

Patent No. __3,602,488__                    Dated __August 31, 1971__

Inventor(s) __John R. Romig__

It is certified that error appears in the above-identified patent and that said Letters Patent are hereby corrected as shown below:

$$W_d = W_a + 91.00(Si)_s + 1680(O)_s$$

$$Z_d = (\Delta D)_d - 47.80(\Delta HM)_o - 44.65(\Delta HL)_o + 6.30(Si)_s + 75.40(C$$

In the above the silica and iron ore in the mix are not controlled, as sufficient quantities are present in the mix lime rock, so that both values $(O)_e$ and $(Si)_e$ are set to zero.

Computer means 34$\underline{m}$ in Fig. 3 tests for a negative value for any of Matrix D computed $(R)_e$, $(Sh)_e$, $(Si)_e$ and $(O)_e$, and in the absence of same the steps 27-30 in Fig. 2 are performed. If a negative value is detected, an alarm is printed out at 58 (see step 32 in Fig. 2).

In the above Matrix B, C and D routines, the recomputed values for $(R)_e$, $(Sh)_e$, $(Si)_e$ and $(O)_e$ are utilized to determine the control settings at 33, as also indicated in Fig. 3.

In Fig. 2, the values indicated in the step blocks 1, 3 and 6 are typically computed and/or read in at regular intervals as for example at intervals between one-half hour and two hours, and preferably about hourly. Also, the values in the step block number 4 represent average values determined during the next preceding interval as defined, as for

UNITED STATES PATENT OFFICE
CERTIFICATE OF CORRECTION

Patent No. 3,602,488            Dated August 31, 1971

Inventor(s) John R. Romig

It is certified that error appears in the above-identified patent and that said Letters Patent are hereby corrected as shown below:

example during the next preceding hour. The values appearing in step block 33, for print out, represent those values appearing in blocks 1-6.

Referring again to the difference values $(\Delta S)_d$, $(\Delta A)_d$, $(\Delta F)_d$ and $(\Delta C)_d$, it will be appreciated that the values for $(R)_e$, $(Sh)_e$, $(Si)_e$ and $(O)_e$ computed by the computer means are such as to lead to the adjustment of flow control gates as at 26 and 27-32 so as to reduce said difference values. Also, in Figs. 1 and 2, the computed values $(R)_q$, $(Sh)_q$, $(Si)_q$ and $(O)_q$ may be analog values (for controlling gates 26 and 29-31) representing tons per hour flow, proportional to $(R)_e$, $(Sh)_e$, $(Si)_e$ and $(O)_e$; and, the computed values $(HL)_q$ and $(HM)_q$ may be analog values (for controlling gates as at 27 and 28) representing tons per hour flow, and proportional to the manual settings $(HM)_o$ and $(HL)_o$.

UNITED STATES PATENT OFFICE
CERTIFICATE OF CORRECTION

Patent No. 3,602,488            Dated August 31, 1971

Inventor(s) John R. Romig

It is certified that error appears in the above-identified patent and that said Letters Patent are hereby corrected as shown below:

I CLAIM:

1. Raw mix blend control apparatus for a cement clinkering kiln feed, comprising a) first means to supply raw materials including lime rock, magnesia rock, alkali shale, silica rock and iron ore to the feed, b) second means to determine the relative amounts $S_x$, $A_x$, $F_x$ and $C_x$ of $SiO_2$, $Al_2O_3$, $Fe_2O_3$ and $CaO$, respectively, which are actually in the feed, c) third means to determine the relative amounts $S_c$, $A_c$, $F_c$, $C_c$ of $SiO_2$, $Al_2O_3$, $Fe_2O_3$ and $CaO$, respectively, desired in the feed, d) fourth means to derive difference values $(\Delta S)_d$, $(\Delta A)_d$, $(\Delta F)_d$ and $(\Delta C)_d$ corresponding to $S_c - S_x$, $A_c - A_x$, $F_c - F_x$ and $C_c - C_x$, respectively, and also to derive $(\Delta HL)_o$ and $(\Delta HM)_o$ values respectively representing running changes in the lime and magnesium content of the feed, and

UNITED STATES PATENT OFFICE
CERTIFICATE OF CORRECTION

Page 11

Patent No. 3,602,488                    Dated August 31, 1971

Inventor(s) John R. Romig

It is certified that error appears in the above-identified patent and that said Letters Patent are hereby corrected as shown below:

e) fifth means responsive to said difference values for controlling said supply of lime rock, alkali shale, silica rock and iron ore to the feed.

2. The apparatus of claim 1 wherein said third means includes a computer responsive to selected relative amounts of oxides of calcium, silicon, aluminum, and magnesium to derive said $S_c$, $A_c$, $F_c$ and $C_c$ values.

3. The apparatus of claim 1 wherein said third means includes a computer responsive to selected values $(C_3S)_o$, $(C_3A)_o$, $M_o$ and $A_o$ to derive said $S_c$, $A_c$, $F_c$ and $C_c$ values, where:

$$(C_3S)_o = 3\ CaO \cdot SiO_2 \text{ (ignited basis)}$$
$$(C_3A)_o = 3\ CaO \cdot Al_2O_3 \text{ (ignited basis)}$$
$$A_o = Al_2O_3 \text{ (unignited basis)}$$
$$M_o = MgO \text{ (unignited basis)}$$

UNITED STATES PATENT OFFICE
CERTIFICATE OF CORRECTION

Patent No. 3,602,488           Dated August 31, 1971

Inventor(s) John R. Romig

It is certified that error appears in the above-identified patent and that said Letters Patent are hereby corrected as shown below:

4. Apparatus as defined in claim 1 wherein said fifth means include flow controllers to control the flow of said raw materials.

5. Apparatus as defined in claim 4 wherein said first means includes separate bins for said respective materials, the flow controllers individually controlling the flow of materials from the separate bins.

6. Apparatus as defined in claim 1 wherein said second means includes instrumentation to direct X-rays at samples of the feed, and to scan the samples for detecting secondary radiation emitted therefrom.

7. Apparatus as defined in claim 1 wherein said second means also includes a mill for grinding said feed, the samples being obtained from the mill output.

UNITED STATES PATENT OFFICE
CERTIFICATE OF CORRECTION

Patent No. 3,602,488          Dated August 31, 1971

Inventor(s) John R. Romig

It is certified that error appears in the above-identified patent and that said Letters Patent are hereby corrected as shown below:

8. Apparatus as defined in claim 1 wherein said fifth means includes computer means to compute up-dated values $(R)_e$, $(Sh)_e$, $(Si)_e$ and $(O)_e$, respectively, for use in proportioning the supply of lime rock, alkali shale, silica rock and iron ore, said up-dated values being defined as follows:

$$(R)_e = (R)_s + (\Delta R)$$
$$(Sh)_e = (Sh)_s + (\Delta Sh)$$
$$(Si)_e = (Si)_s + (\Delta Si)$$
$$(O)_e = (O)_s + (\Delta O)$$

where $(R)_s$, $(Sh)_s$, $(Si)_s$ and $(O)_s$ represent the next previously calculated values of $(R)_e$, $(Sh)_e$, $(Si)_e$ and $(O)_e$, and wherein $$(\Delta Sh) = (\Delta Sh)\left[(\Delta C)_d, (\Delta S)_d, (\Delta A)_d, (\Delta F)_d, (\Delta HM)_o, (\Delta HL)_o\right]$$
$$(\Delta Si) = (\Delta Si)\left[(\Delta C)_d, (\Delta S)_d, (\Delta A)_d, (\Delta F)_d, (\Delta HM)_o, (\Delta HL)_o\right]$$
$$(\Delta O) = (\Delta O)\left[(\Delta C)_d, (\Delta S)_d, (\Delta A)_d, (\Delta F)_d, (\Delta HM)_o, (\Delta HL)_o\right]$$
$$(\Delta R) = (\Delta R)\left[(\Delta Sh), (\Delta Si), (\Delta O), (\Delta HM)_o, (\Delta HL)_o\right]$$
$$(\Delta HM)_o = \text{currently entered } (HM)_o - \text{last used } (HM)_o$$
$$(\Delta HL)_o = \text{currently entered } (HL)_o - \text{last used } (HL)_o$$

UNITED STATES PATENT OFFICE
CERTIFICATE OF CORRECTION

Patent No. 3,602,488                Dated August 31, 1971

Inventor(s) John R. Romig

It is certified that error appears in the above-identified patent and that said Letters Patent are hereby corrected as shown below:

9. Apparatus as defined in claim 8 wherein:

$$\Delta Sh \simeq 0.010368 V_a - 0.003007 W_a + 0.112038 X_a - 0.007216 Y_a + 0.006489 Z_a$$

where:

$$V_a = (\Delta C)_d - 44.20 (\Delta HM)_o - 53.35 (\Delta HL)_o$$
$$W_a = (\Delta S)_d - 8.00 (\Delta HM)_o - 2.00 (\Delta HL)_o$$
$$X_a = (\Delta A)_d - 1.20 (\Delta HM)_o - 0.44 (\Delta HL)_o$$
$$Y_a = (\Delta F)_d - 1.30 (\Delta HM)_o - 0.20 (\Delta HL)_o$$
$$Z_a = (\Delta D)_a - 44.70 (\Delta HM)_o - 44.01 (\Delta HL)_o$$

and, $$(\Delta D)_a = -\left[(\Delta C)_d + (\Delta S)_d + (\Delta A)_d + (\Delta F)_d\right]$$

10. Apparatus as defined in claim 9 wherein $$(\Delta Si) = 0.000306 V_a + 0.012824 W_a - 0.64980 X_a + 0.00137 \cdot 0.000014 Z_a.$$

11. Apparatus as defined in claim 10 wherein:

$$(\Delta O) = 0.000911 V_a + 0.000029 W_a - 0.007471 X_a + 0.017291 Y_a - 0.001108 Z_a$$

UNITED STATES PATENT OFFICE
CERTIFICATE OF CORRECTION

Patent No. 3,602,488            Dated August 31, 1971

Inventor(s) John R. Romig

It is certified that error appears in the above-identified patent and that said Letters Patent are hereby corrected as shown below:

12. Apparatus as defined in claim 11 wherein:

$$(\Delta R) = - \left[(\Delta Sh)+(\Delta Si)+(\Delta O)+(\Delta HM)_o+(\Delta HL)_o\right].$$

13. Apparatus as defined in claim 8 wherein said fifth means includes means to test for the existence of a negative up-dated value of any of $(R)_e$, $(Sh)_e$, $(Si)_e$ and $(O)_e$.

14. Apparatus as defined in claim 8 including means to test for the existence of a negative up-dated value of $(Sh)_e$, and in that event, to provide an alarm signal.

UNITED STATES PATENT OFFICE
CERTIFICATE OF CORRECTION

Patent No. 3,602,488                    Dated  August 31, 1971

Inventor(s) John R. Romig

It is certified that error appears in the above-identified patent and that said Letters Patent are hereby corrected as shown below:

15. Apparatus as defined in claim 13 including means operable in the event of such a negative value to test for the existence of a negative up-dated value of $(Sh)_e$ and, in the absence thereof, to re-compute values for $(R)_e$, $(Sh)_e$ and $(Si)_e$ ( $(O)_e$ being set to zero) in accordance with the definitions thereof in claim 8 and wherein, specifically, $$\Delta Sh = -0.009689 V_b - 0.002985 W_b + 0.106473 X_b + 0.005663 Z_b$$

$$\Delta Si = 0.000249 V_b + 0.12823 W_b - 0.064512 X_b + 0.00055 Z_b$$

$$\Delta R = -\left[(\Delta Sh) + (\Delta Si) - (O)_s + (\Delta HM)_o + (\Delta HL)_o\right]$$

$$(\Delta D)_b = -\left[(\Delta C)_d + (\Delta S)_d + (\Delta A)_d\right]$$

$$V_b = V_a + 7.80 (O)_s$$

$$W_b = W_a + 16.80 (O)_s$$

$$X_b = X_a + 4.40 (O)_s$$

$$Z_b = (\Delta D)_b - 46.00 (\Delta HM)_o - 44.21 (\Delta HL)_o + 71.00 (O)_s$$

UNITED STATES PATENT OFFICE
CERTIFICATE OF CORRECTION

Patent No. 3,602,488           Dated August 31, 1971

Inventor(s) John R. Romig

It is certified that error appears in the above-identified patent and that said Letters Patent are hereby corrected as shown below:

16. Apparatus as defined in claim 15 including means to test for the existence of a negative value for any of recomputed $(R)_e$, $(Sh)_e$, $(Si)_e$ and $(O)_e$, and in the absence thereof, to enable said control of the supply of lime rock, alkali shale, silica rock and iron ore with relative proportioning corresponding to said recomputed values.

17. Apparatus as defined in claim 16 including means operable in response to the existence of a negative value for any of recomputed $(R)_e$, $(Sh)_e$, $(Si)_e$ and $(O)_e$ to again re-compute values therefore in accordance with the definitions thereof in claim 8 and wherein, specifically, $$(\Delta Sh) = -0.009871 V_c + 0.017829 W_c - 0.005368 Y_c + 0.005465 Z_c$$
$$(\Delta O) = 0.000881 V_c - 0.001227 W_c + 0.017180 Y_c - 0.001107 Z_c$$
$$(\Delta R) = -\left[(\Delta Sh) - (Si)_s + (\Delta O) + (\Delta HM)_o + (\Delta HL)_o\right]$$
$$(\Delta D)_c = -\left[(\Delta C)_d + (\Delta S)_d + (\Delta F)_o\right]$$
$$V_c = V_a + 2.70 (Si)_s$$
$$W_c = W_a + 91.00 (Si)_s$$
$$Y_c = Y_a + 1.00 (Si)_s$$
$$Z_c = (\Delta D)_c - 46.50 (\Delta HM)_o - 44.45 (\Delta HL)_o + 5.30 (Si)_s$$

UNITED STATES PATENT OFFICE
CERTIFICATE OF CORRECTION

Patent No. 3,602,488  Dated August 31, 1971

Inventor(s) John R. Romig

It is certified that error appears in the above-identified patent and that said Letters Patent are hereby corrected as shown below:

18. Apparatus as defined in claim 17 including means to test for the existence of a negative value for any of again re-computed $(R)_e$, $(Sh)_e$, $(Si)_e$ and $(O)_e$, and in the absence thereof, to enable said control of the supply of lime rock, alkali shale, silica rock and iron ore with relative proportioning corresponding to said again re-computed values.

UNITED STATES PATENT OFFICE
CERTIFICATE OF CORRECTION

Page 19

Patent No. 3,602,488                                       Dated August 31, 1971

Inventor(s) John R. Romig

It is certified that error appears in the above-identified patent and that said Letters Patent are hereby corrected as shown below:

19. Apparatus as defined in claim 18 including means operable in response to the existence of a negative value for any of the again re-computed $(R)_e$, $(Sh)_e$, $(Si)_e$ and $(O)_e$ to once again re-compute values therefor in accordance with the definitions thereof in claim 8 and wherein, specifically, $$(\Delta Sh) = -0.009300 V_d + 0.017035 W_d + 0.005749 Z_d$$
$$(\Delta R) = -\left[(\Delta Sh)-(Si)_s-(O)+(\Delta HM)_o+(\Delta HL)_o\right]$$
$$(\Delta D)_d = -\left[(\Delta C)_d+(\Delta S)_d\right]$$
$$V_d = V_a + 2.70 (Si)_s + 7.80 (O)_s$$
$$W_d = W_a + 91.00 (Si)_s + 1680 (O)_s$$
$$Z_d = (\Delta D)_d - 47.80 (\Delta HM)_o - 44.65 (\Delta HL)_o + 6.30 (Si)_s + 75.40 (O)$$

20. Apparatus as defined in claim 8 including means to record the up-dated values of $(R)_e$, $(Sh)_e$, $(Si)_e$ and $(O)_e$. --

Signed and sealed this 21st day of May 1974.

(SEAL)
Attest:

EDWARD M. FLETCHER, JR.                       C. MARSHALL DANN
Attesting Officer                             Commissioner of Patents